(12) United States Patent
Glazer

(10) Patent No.: US 9,665,903 B2
(45) Date of Patent: May 30, 2017

(54) ORDERING SYSTEM AND METHOD PARTICULARLY USEFUL FOR ORDERING ARTICLES OF FOOD

(76) Inventor: Yariv Glazer, Ann Arbor, MI (US)

( * ) Notice: Subject to any disclaimer, the term of this patent is extended or adjusted under 35 U.S.C. 154(b) by 575 days.

(21) Appl. No.: 13/877,330

(22) PCT Filed: Oct. 2, 2011

(86) PCT No.: PCT/US2011/054520
§ 371 (c)(1),
(2), (4) Date: Apr. 1, 2013

(87) PCT Pub. No.: WO2012/047769
PCT Pub. Date: Apr. 12, 2012

(65) Prior Publication Data
US 2013/0204742 A1    Aug. 8, 2013

Related U.S. Application Data

(60) Provisional application No. 61/389,260, filed on Oct. 3, 2010.

(51) Int. Cl.
G06Q 30/06      (2012.01)
A47F 10/00      (2006.01)
A47F 10/06      (2006.01)
E04H 3/14       (2006.01)
E04H 3/30       (2006.01)

(52) U.S. Cl.
CPC ......... *G06Q 30/0633* (2013.01); *A47F 10/00* (2013.01); *A47F 10/06* (2013.01); *E04H 3/14* (2013.01); *E04H 3/30* (2013.01)

(58) Field of Classification Search
CPC ......... G06Q 30/00–30/08; A47F 10/00–10/06; E04H 3/14–3/20
See application file for complete search history.

(56) References Cited

U.S. PATENT DOCUMENTS

| 3,615,003 A * | 10/1971 | Rust ........................... 198/687.1 |
| 6,920,431 B2 * | 7/2005 | Showghi et al. ................ 705/15 |
| 2009/0101445 A1 * | 4/2009 | Mack ............................. 186/38 |
| 2009/0167553 A1 * | 7/2009 | Hong et al. ............... 340/825.29 |

\* cited by examiner

*Primary Examiner* — Michael Misiaszek

(57) ABSTRACT

A system and method for ordering various types of articles includes: an input device for each person enabling the person to order designated articles to be delivered to a designated seat and row in a seat section; an article source for supplying articles designated in each order; a conveyor system having a first conveyor section extending along a first axis from the article source, and a second conveyor section extending along a second axis from the first conveyor section to the seats of the seat section; and a central control in communication with the input devices for receiving orders therefrom and for controlling the conveyor system to convey the articles designated in each order to a compartment at a convenient location to the occupant of the seat and row designated in the respective order.

16 Claims, 5 Drawing Sheets

ORDERING SYSTEM AND METHOD PARTICULARLY USEFUL FOR ORDERING ARTICLES OF FOOD

RELATED APPLICATION

This application is related to U.S. Application Ser. No. 61/389,260, filed Oct. 3, 2010, the priority date of which is claimed herein, and the complete disclosure of which is incorporated herein by reference.

FIELD AND BACKGROUND OF THE INVENTION

The present invention relates to a system and method for ordering various types of articles for automatic delivery to compartments for designated seats conveniently accessible to the occupants of the respective seats. The invention is capable of being used in many diverse applications, including: low-volume applications, such as delivering articles to occupants of seats in an aircraft cabin, a bus, or a railroad car; medium-volume applications, such as delivering articles to occupants of seats in an auditorium or concert hall; and large-volume applications, such as delivering articles to occupants of a multi-level sports stadium.

The invention is particularly useful for delivering articles of food, and is therefore described below with respect to such application, but it will be appreciated that the articles to be ordered and delivered could be other type of articles, such as souvenirs, articles commemorating special events, and the like.

Many different types of articles ordering and delivering systems are known. For example, in low-volume systems, such as in aircraft cabins or railroad diner cars, orders are generally solicited by attendants who personally take each and directly deliver the ordered articles to the respective individual. In auditoriums or concert halls, a person desiring to receive food or drink must physically go to a different location to order and receive the ordered article thereby missing a part of the performance, or requiring the performance to allocate an intermission period for this purpose. In large sport stadiums or arenas, the attendees are generally serviced by sales persons who travel along different locations within the seat sections of the stadium or arena, shouting their wares and delivering them personally to the occupants of the respective seats. Such arrangements, among other disadvantages, are highly disruptive and require a large number of salespersons.

OBJECTS AND BRIEF SUMMARY OF THE PRESENT INVENTION

An object of the present is to provide a system and method for ordering various articles, particularly but not exclusively food articles, in a manner which has advantages in many of the above respects.

According to one broad aspect, the present invention provides a system for ordering various types of articles comprising: an input device for each person enabling the person to order designated articles to be delivered to a designated seat and row in a seat section; an article source for supplying articles designated in each order; a conveyor system extending from the article source to the seats of the seat section; and a central control in communication with the input devices for receiving orders therefrom and for controlling the conveyor system to convey the articles designated in each order to a compartment at a convenient location to the occupant of the seat and row designated in each respective order.

According to further features in the preferred embodiments described below, both the conveyor system and the compartments are located under the seats in the seat region. In addition, the central control includes a validation processor for validating each order according to the authorized or designated method of payment. Further, each order designates a plurality of food and/or other articles; and the central control includes an aggregation processor for aggregating the designated articles on an article carrier to be conveyed from the article source to the compartment of the seat and row designated in the respective order. The article source may include a single source or a plurality of sources each for supplying a different type of food and/or other article and the aggregation processor aggregates all the articles designated in an order on a common article carrier.

The invention is particularly useful when the input devices are mobile devices, such as mobile phone in wireless communication with the central control.

Several embodiments of the invention are described below for purpose of example. One embodiment is described particularly useful for low-volume applications, such as in aircraft cabins, buses, and railroad cars; a second embodiment is described particularly useful for medium-volume applications, such as in auditoriums or concert halls; and a third embodiment is described particularly useful for high-volume applications, such as large arenas or stadiums.

According to another aspect, the present invention provides a method of ordering selected articles from an article source for a person occupying, or intending to occupy, a particular seat in a particular row of a seat section, such method includes: providing each person with an input device enabling the person to order selected articles from the article source and to designate the particular row and seat to which the selected articles are to be delivered; and controlling, from a central control, a conveyor system to deliver the selected articles from the article source to a compartment conveniently accessible to the occupant of the designated seat and row.

As will be described more particularly below, such an ordering system and method can be implemented in low-volume applications, medium-volume applications, and large-volume applications, for efficient ordering and delivering selected articles, particularly food articles, in a manner minimizing personnel to deliver the ordered articles and avoiding disruptions in the normal activities of the persons ordering the articles.

Further features and advantages of the invention will be apparent from the description below.

It is to be understood that the foregoing drawings and description below are provided primarily for purposes of facilitating understanding the conceptual aspects of the invention and possible embodiments thereof, including what is considered to be preferred embodiments. In the interest of clarity and brevity, no attempt has been made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

General

Figure 1:
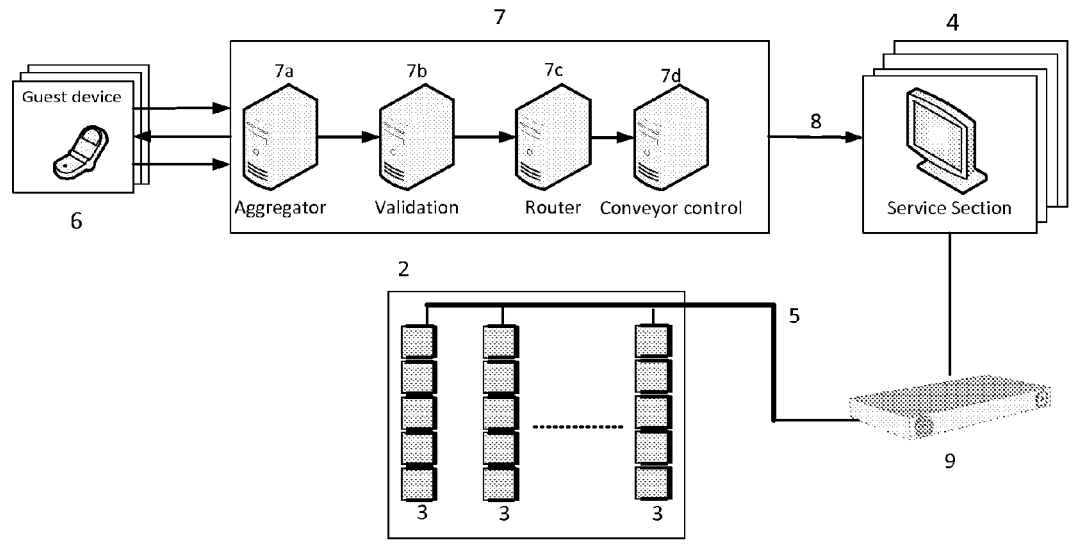
FIG. 1 schematically illustrates the main components in one form of ordering system, in accordance with the present invention.

FIG. 1 schematically illustrates, for a purpose of example, a large-volume embodiment of the invention in the form of a sport arena or stadium, generally designated 2, divided into a plurality of seat sections each indicated at 3. As will be described more particularly below, each seat section 3 includes a plurality of seats arranged in a plurality of rows located at the same level or at different levels.

Seat section 3 is serviced by one of a plurality of service sections 4 via a conveyor system 5 leading from the respective service section 4 to its respective seat section 3. Each service section 4 is conveniently located with respect to its respective seat section 3 and supplies the ordered articles, e.g. food, souvenirs, and the like, to the section, row and seat designated in any particular order.

The orders are inputted via a plurality of input devices 6, one for each person (e.g. an occupant) of the respective seat making the order, to be delivered to the section, row and seat designated in the respective order. For this purpose, the orders are transmitted via input devices 6 to a central control 7 in communication with all the input devices and also with all the service stations 4, as well as with all the conveyor systems 5. An article ordered via one of the input devices 6 is thus conveyed by the conveyor system 5 from the respective service section 4 to the designated seat section 3, and particularly to the occupant of the seat in the designated row of the respective section. The articles are delivered to a compartment underlying the respective seat so as to be conveniently located to the occupant occupying the seat designated in the respective order.

As further seen in FIG. 1, the central control 7, includes a plurality of processors for processing each order received from an input device 6. It thus includes: an aggregator 7a which identifies the various articles in the respective order; a validator 7b which validates the respective order, i.e. whether the input device has specified an acceptable method of payment, whereas the article ordered is authorized for the person ordering it (e.g. an alcoholic beverage), etc.; a router 7c which directs the order to the appropriate service section 4 via a communication system 8, and controls the service section to load the ordered articles on a common article carrier 9; and a conveyor control 7d which controls the conveyor systems 5 to cause it to deliver the article carriers 9, and the articles carried there on, to the compartment of the seat designated in the respective order.

Figure 2:
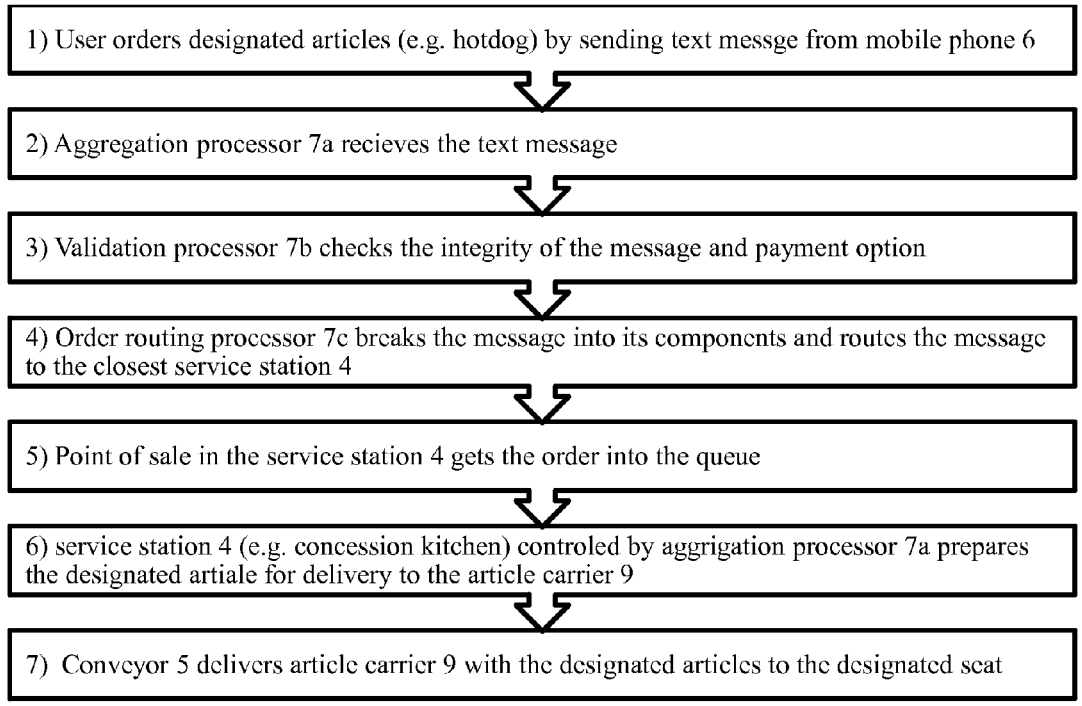
FIG. 2 is a flow diagram schematically illustrating the main steps in an ordering system constructed in accordance with FIG. 1.

The overall operation of the system is generally illustrated by steps 1-7 in the flow chart of FIG. 2:

Thus, in step 1, the user orders the designated articles (food and/or other articles) by sending a text message from the respective input device 6, e.g., a mobile phone; in step 2, the aggregation processor 7a receives the text message; in step 3, the validation processor 7a checks the integrity of the message and payment option; in step 4, the order routing processor 7c breaks the message into its components, i.e. identifies the various articles ordered, and routes the message to the closest service station 4; and in step 5, the respective service station 4 places the order into the queue for delivery.

The respective service station 4 may be a concession kitchen which prepares the ordered article if it is a food article, or it may merely store the respective articles (food or other articles) for selection and delivery as and when ordered. In any event, the service station 4 is controlled by aggregation processor 7a and prepares the articles designated in the respective order for delivery to the article carrier 9.

After the article carrier 9 has been loaded with the articles ordered in a particular order, it is delivered to the conveyor system 5 which delivers the article carrier 9, with the designated articles, to the compartment of the designated seat.

As indicated earlier, while the system schematically illustrated in FIG. 1 is for use in a high-volume implication of the invention, such as in a sports arena or stadium, it may also be used in low-volume applications, such as, in aircraft cabins, railroad cars, buses and alike, as well as in medium-volume application such as in auditoriums or concert halls. An example of each such application is described below. In each example, both the conveyor system and the compartments to which the articles are delivered, underlie the seat in the seat section.

Low-Volume Embodiment

FIGS. 3-6e illustrate an example of a low-volume application of the invention, such as may be used in an aircraft cabin, railroad car, bus, and the like, where only one seat section 3 is provided to be serviced by only one service section 4.

Figure 3:
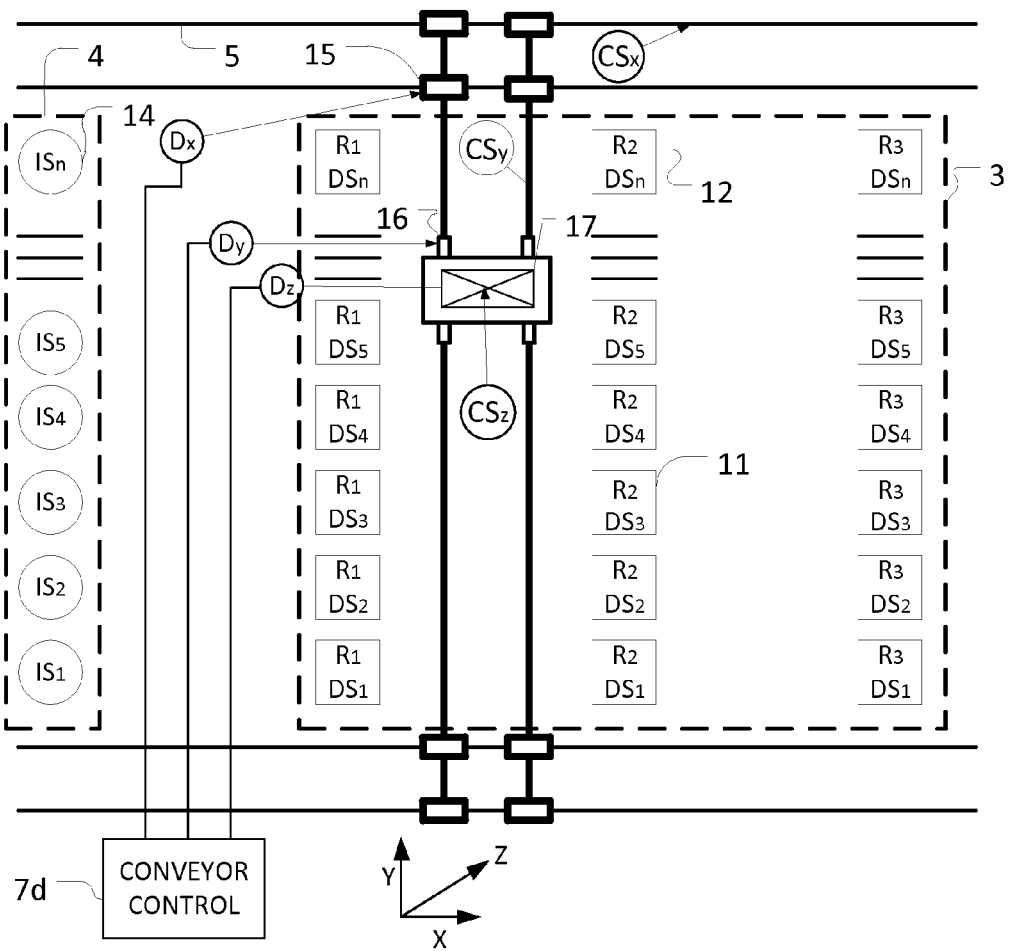
FIG. 3 is a schematic diagram illustrating a low-volume ordering system constructed in accordance with the invention.

The seat section 3 includes a plurality of seats 11 arranged in rows 12. As shown in FIG. 3, the rows 12 are spaced from each other along a first axis, in this case the X-axis; and the seats 11 in each row are spaced from each other along a second axis, in this case the Y-axis.

The conveyor system 5 in FIG. 1 delivers the article carrier 9 along the X-axis to the designated row 12, and then along the Y-axis to the designated seat 11. For this purpose, the conveyor system includes a first conveyor section CSx extending along the X-axis, and a second conveyor section CSy extending along the Y-axis.

As further shown in FIG. 3, the X-axis conveyor section CSx includes two such sections fixed on opposite sides of the seat section 3 so as to straddle that section. The Y-axis conveyor section CSy is a movable section, movably mounted at its opposite ends to the two X-axis conveyor section CSx so as to be movable along the X-axis to selected locations between each row 12 of seats 11. Thus, the Y-axis conveyor section CSy, carrying the article carrier 9, may be moved along the X-axis conveyor section CSx to locate the article carrier 9, with the articles carried on there, to a selected row, and then the article carrier 9 may be moved along the Y-axis on the Y-axis conveyor section CSy to a designated seat 11 in the respective row.

In the example illustrated in FIG. 3, the service section 4 in FIG. 1 is located adjacent to the seat section 3. It includes a plurality of input sources located in a row spaced along the X-axis from the rows 12 of seats 11. The input sources are spaced from each other along the Y-axis. Thus, during a loading operation the Y-axis conveyor section CSy may be moved to align the article carrier 9 with the row 4 of input sources 14, and then the article carrier 9 may be moved along the Y-axis conveyor section CSy to align it with one or more of the input sources 14 in order to receive articles from the respective source. Thereafter, the article carrier 9 may be conveyed, in the manner described above, to a selected row 12 and a selected seat 11 therein for delivery of the articles to the compartment of the designated seat.

The conveyor control processor 7d in FIG. 1 controls the X-axis drive Dx to move the movable Y-axis conveyor section CSy to the proper row, and also controls the Y-axis drive Dy to move the article carrier 9 on the Y-axis conveyor section CSy to align it with the compartment of the selected seat 11 of the selected row 12. In the example illustrated in FIG. 3, the conveyor sections are in the form of bi-rails; the X-axis drive Dx controls drive wheels 15 at the opposite ends of the Y-axis conveyor section CSy; and Y-axis drive Dy controls drive wheels 16 on the opposite end of the article carrier 9.

As further illustrated in FIG. 3, the article carrier 9 carries a tray or article holder 17 which receives the articles from their respective input sources 14 and delivers them via the conveyor system 5 to the row 12 and seat 11 designated in the respective order. As indicated above, the conveyor system 5 underlies the seats 11 in the seat section 3, and the article holder 17 delivers the selected articles to a compartment underlying the respective seats so as to be conveniently accessible to the occupant of that seat.

Figure 5A:
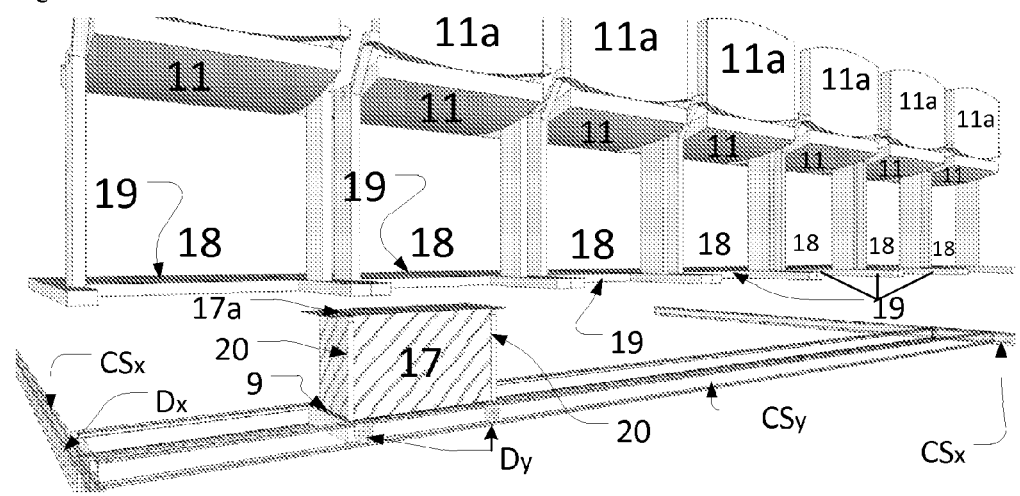
FIGS. 5a and 5b illustrate two stages in a delivery operation of the ordering system of FIG. 3.

Thus, as shown in FIG. 5a, the two conveyor sections CSx and CSy of the conveyor system 5 underlie all the seats 11, and under each seat is a compartment 18 defined by a ledge 19 for receiving the articles to be delivered to the respective seat. Each compartment 18 is accessed from its backside as defined by the seat back 11a.

Figure 4:
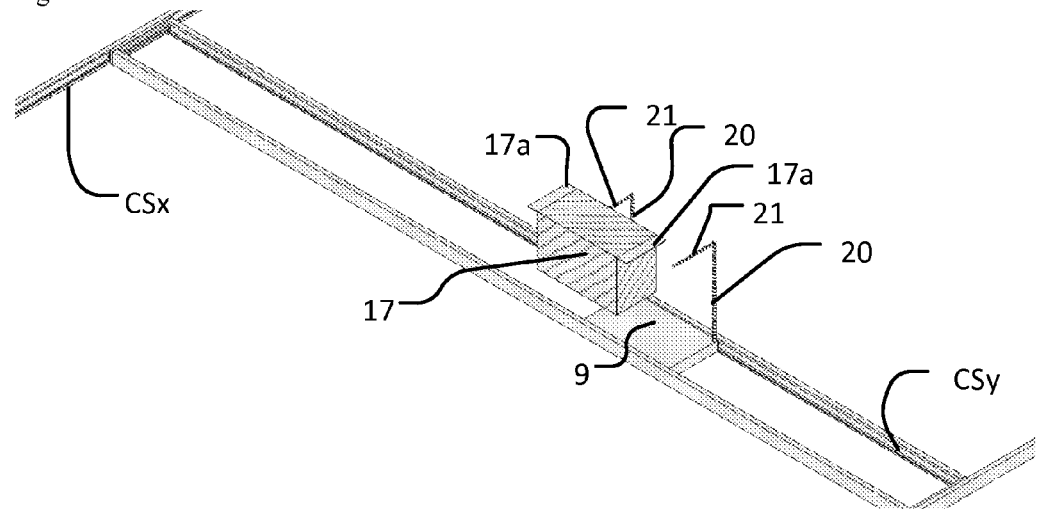
FIG. 4 illustrates the article carrier in the ordering system of FIG. 3.

As seen in FIG. 4, each article holder 17 includes, at its upper end, a pair of lateral extensions 17a which are provided to facilitate manipulation of the article holder. For this purpose, the article carrier 9 includes a fork-lift type structure of two vertically-extensible posts 20 having spaced horizontal arms 21 which engage the article holder extensions 17a, to lift the article holder off the article carrier 9, to move it (in the X-direction) into the compartment 18 of the designated seat, and then to lower the article holder 17 onto the ledge 19 of the designated compartment 18.

The vertically extensible posts 20 may be screws, for example, rotatable in one direction to elevate the article holder 17, and in the opposite direction to lower it onto the ledge 19. The screws 20 thus in affect constitute a Z-axis conveyor section, schematically indicated as CSz in FIG. 3, which are driven by a Z-axis drive, schematically indicated by Dz in FIG. 3.

Figure 5B:
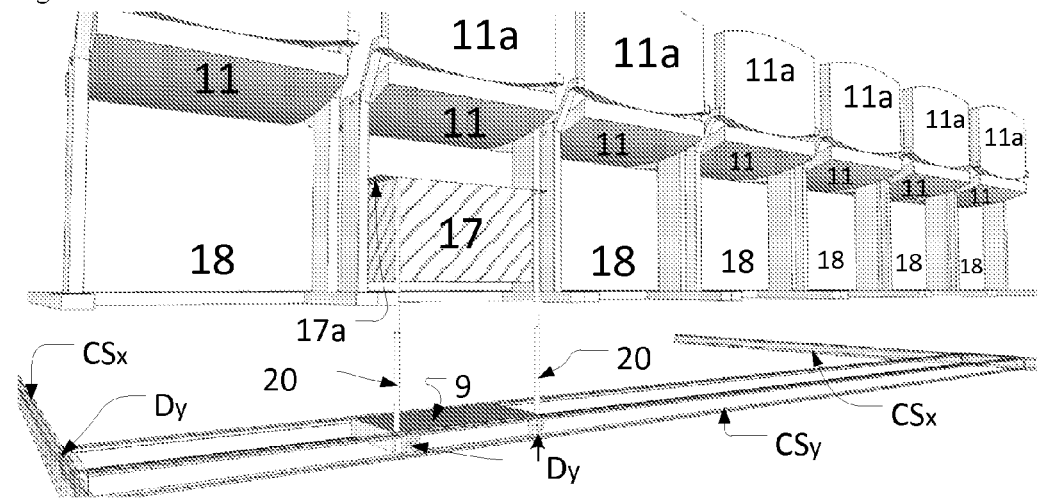
Figure 6:
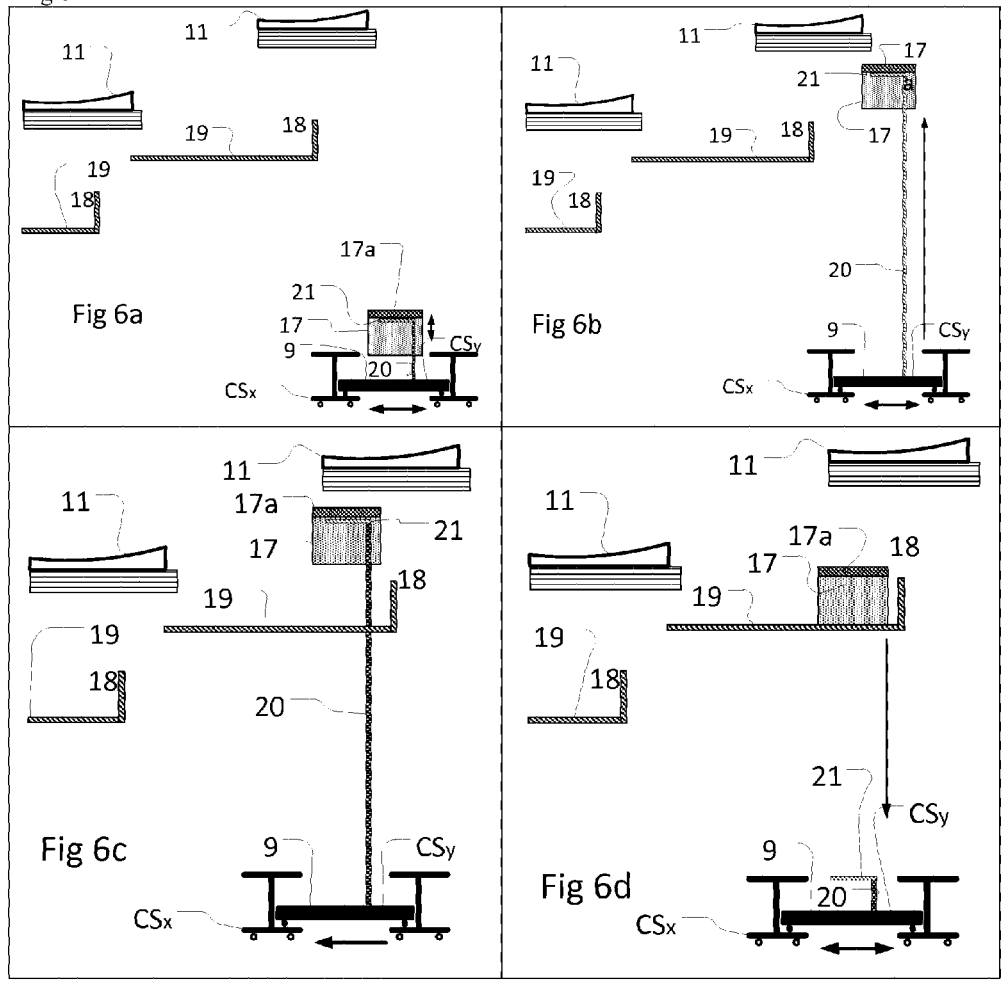
FIG. 6a-6d schematically illustrates a complete delivery operation in the ordering system of FIG. 3.

FIG. 5a illustrates the condition of the conveyor system when the article holder 17 on the article carrier 9 has been delivered to the compartment 18 of the seat 11 designated in a respective order; and FIG. 5b illustrates the later condition when the article holder 17 has been lifted in the vertical (Z-axis) direction and introduced into the respective compartment 18 just before it is lowered onto the ledge 19 of the compartment.

FIG. 6a-6d schematically illustrate a complete delivery operation for delivering an article holder 17, after having been loaded from the input sources 14 in its respective service station 4, to the compartment 18 of the seat 11 designated to receive the order. For purposes of simplicity, only one of the screws 20 used for driving the article holder 17 in the Z-direction is shown engaging its respective extension 17a and for transferring the article holder onto ledge 19 of the respective compartment 18. These figures also schematically show the article carrier 9 carrying the article holder 17, the Y-axis conveyor section CSy along which the article carrier 9 is movably mounted, and the X-axis conveyor sections CSx along which the Y-axis conveyor section CSy is movably mounted to bring the article holder to the compartment 18 of the selected seat 11.

FIG. 6a illustrates the conditions wherein the article holder 17 has been conveyed into alignment with, but below, the compartment 18 of the selected seat 11. The vertical drive (Dx, FIG. 3), which drives the screws 20, is then actuated to raise the article carrier 17 to a position above ledge 19 of the respective compartment (FIG. 5b); the X-axis drive (Dx, FIG. 3) is then actuated to move the article carrier into the compartment 18 (FIG. 5c); and finally, the Z-axis drive is actuated in the reverse direction to lower the article holder 17 onto the ledge 19 of compartment 18 and to return the Z-axis drive screws 20 to their normal, lower positions. The article carrier can then be returned to the service section for reloading and for delivering the next received order.

In the low-volume system illustrated in FIGS. 3-6d, only one article holder is processed during each operation, and therefore, only a single article carrier is needed. It may be returned to the service area section after each delivery operation by merely reversing the operations of the various drives so that it retraces its delivery path in the reverse direction.

It will be appreciated that the rows in this embodiment may be of a single level, or of multiple levels. If they are of a single level, the Z-axis drive Dz is driven the same distance for each row when delivering an article holder 17 to a compartment 18 of a selected seat 11; but if the rows are arranged in multiple levels, the Z-axis drive Dz would be driven different distances, according to the level of the seat compartment to which the article holder is to be delivered.

Medium-Volume Embodiment

Figure 7:
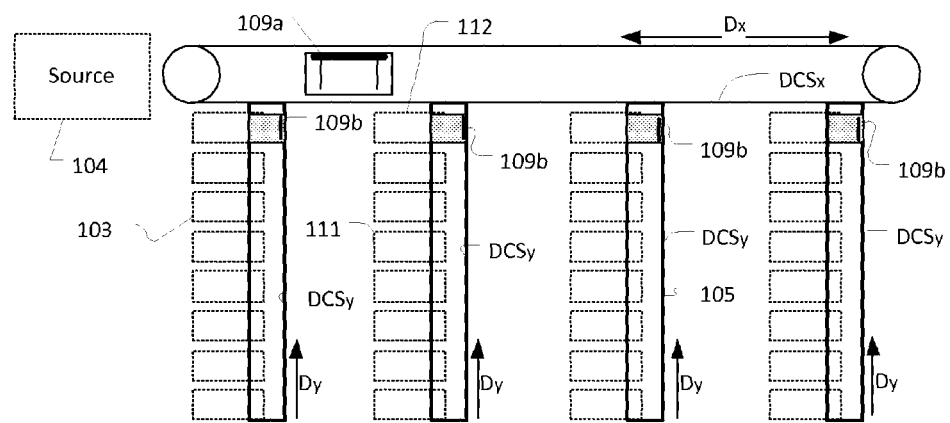
FIG. 7 schematically illustrates a medium-volume ordering system in accordance with the present invention.
Figure 8:
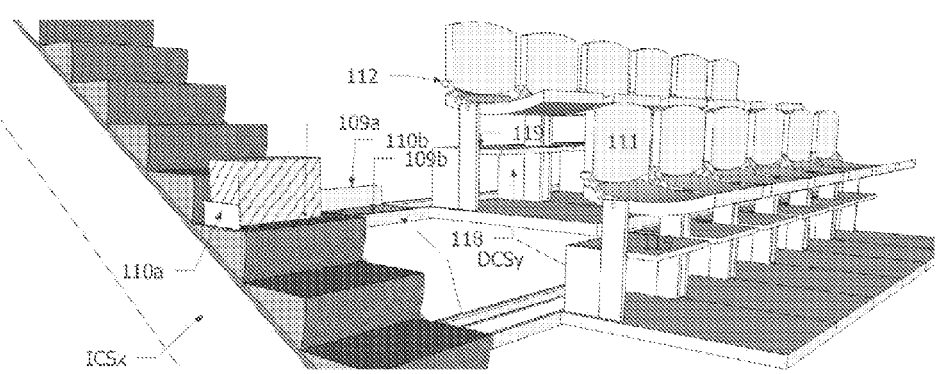
FIG. 8 illustrates the operation of the ordering system of FIG. 7.

FIGS. 7 and 8 illustrates an embodiment of the invention suitable for medium-volume applications. In this illustrated embodiment, the seats are arranged in rows at different levels, but it will be appreciated, as will be discussed below, that this embodiment is also suitable for applications wherein the seats are all arranged at the same level.

As schematically shown in FIGS. 7 and 8, all the seats 111 in the seat section 103 are arranged in rows 112, with the rows spaced apart along the X-axis, and the seats 111 of each row are spaced from each other along the Y-axis. In addition a compartment 118 is provided under each seat for receiving its articles. The illustrated system further includes a source section 104 which is conveniently located to the seat section 103, and may include a single input source as shown at 104 in FIG. 7, or a plurality of input sources as shown at 14 in FIG. 3.

In the medium-volume system of FIGS. 7 and 8, the conveyor system 105 includes a single input conveyor section ICSx extending along a first axis, namely the X-axis, and a plurality of distribution conveyor sections DCSy extending along a second axis, namely the Y-axis, each between a pair of rows 112. The input conveyor section ICSx communicates with the input source 104 and is driven by an X-axis drive Dx. Each distribution conveyor section DCSy is driven by a Y-axis drive Dy. It communicates at one end with the input conveyor section ICSx, and along its length, with the compartment of the seats 111 in the respective row 112.

In the illustrated conveyor system, an article carrier 109a is carried by and movable along the input conveyor section ICSx, and another article carrier 109b is carried by and movable along each of the distribution conveyor sections DCSy. Article carriers 109a, 109b are more particularly illustrated in FIG. 8, wherein it can be seen that each includes a shifter 110a, 110b, respectively: shifter 110a shifts the articles on its article carrier 109a in the Y-direction onto article carrier 109b of the selected distribution conveyor section DCSy; whereas shifter 110b shifts the article carried by its article carrier 109b in the X-direction into the compartment 118 of the seat designated to receive the articles ordered.

The conveyor system of FIGS. 7 and 8 does not require a Z-axis drive because the articles are shifted into the compartment along the X-axis, rather than being lifted into the compartment along the Z-axis as described in the earlier embodiments. If the seats 111 are arranged in rows at different levels, the input conveyor section ICSx may be in a form of moving stairs, e.g., an escalator, as shown in FIG. 8, to bring the article carrier 109a to the respective level of the selected distribution conveyor section. On the other hand, if all the rows are at the same level, the input conveyor section ICSx may be at a single level extending along the X-axis, as shown and describe above.

Preferably, the input conveyor section ICSx is continually operated, whereas each of the distribution conveyor section DCSy is intermittently operated only when the article carrier on it is to be used for delivery of ordered article to a seat compartment in the respective row. It will be appreciated however that the input conveyor section ICSx may also be intermittently operated.

High-Volume Embodiments

Figure 9:
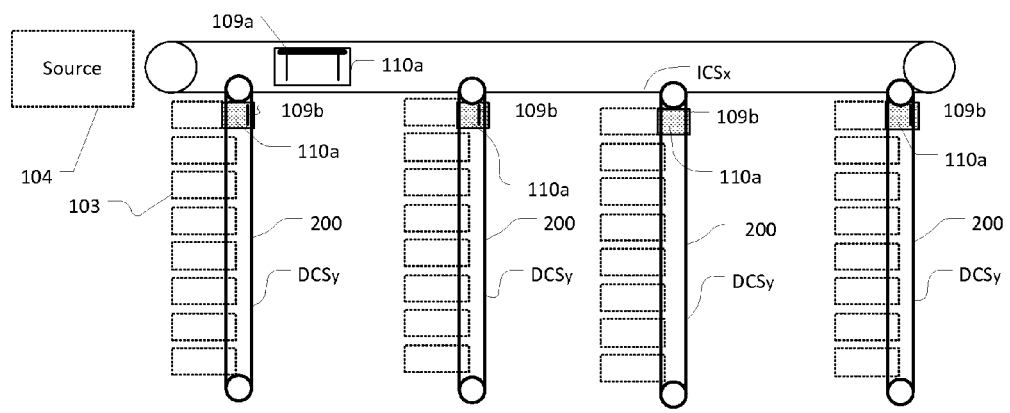
FIG. 9 schematically illustrates a high-volume ordering system in accordance with the invention.

FIG. 9 illustrates a high-volume embodiment which is basically the same as the medium-volume embodiment of FIGS. 7 and 8, except that all the distribution conveyor sections DCSy are continuously operated; also each is in the form of a closed loop, as schematically indicated by the broken lines 200 in FIG. 9.

The input conveyor section ICSx is also continuously driven. In addition, the input conveyor section ICSx is provided with a plurality of article carriers, shown as 219a, to accommodate a large volume of orders. Each of the distribution conveyor sections DSCy is also provided with a plurality of article carriers, 219b, so as to enable a large number of article carriers to be conveyed to different destinations concurrently. Thus, each article carrier will be returned to its original location by the closed-loop arrangement so that the whole operation proceeds only in one direction, thereby accommodating a large number of orders at one time.

Further Variations

Figure 10:
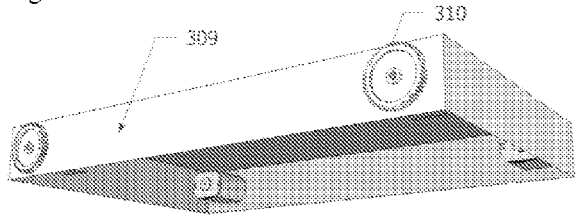
FIG. 10 schematically illustrates a preferred construction applicable to all of the described embodiments of the invention wherein each conveyor section is in the form of rails.
Figure 11:
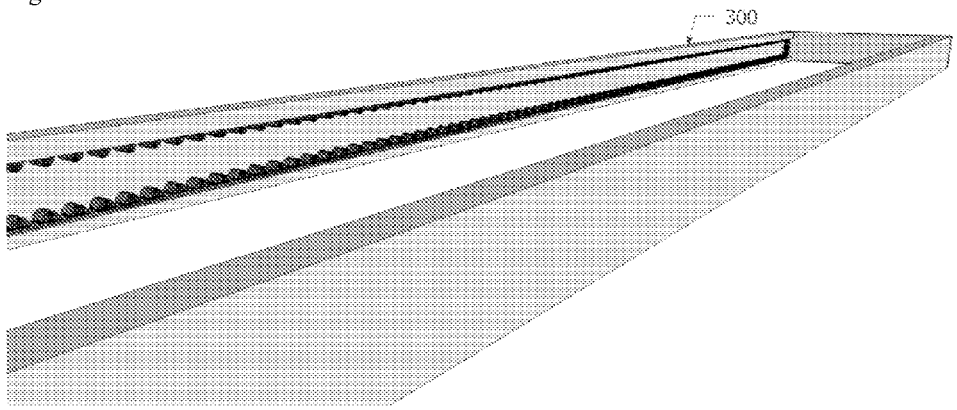
FIG. 11 illustrates a variation applicable to the all of the described embodiments of the invention wherein each conveyor section is in the form of a belt.

As indicated earlier, the various conveyor sections may be in the form of bi-rails, monorails, belts or the like. FIG. 10 illustrates an article carrier 309 which is driven on bi-rails by tooth wheels 310, where FIG. 11 illustrates a conveyor section in the form of a belt 320 for driving the article carrier (not shown).

While the invention has been described with respect to several preferred embodiments, it will be appreciated that these are set forth merely for purposes of example, and that many other variations, modifications and applications of the invention may be made.

What is claimed is:

1. An ordering system for ordering various types of articles comprising:
    an input device enabling a person to order designated articles to be delivered to a designated seat and row in a seat section;
    wherein said input device is an electronic device, such as a mobile phone, belonging to the person placing the order;
    an article source for supplying articles designated in each order;
    a conveyor system extending from said article source to said seats of said seat section;
    a central control in communication with said input devices for receiving orders therefrom and for controlling said conveyor system to convey the articles designated in each order to a compartment at a location adjacent to the occupant of the seat and row designated in each respective order; and
    wherein both said conveyor system and said compartments are located under the seats in said seat section.

2. The ordering system according to claim 1, wherein each input device is authorized for, or designates, a particular method of payment; and wherein said control includes a validation processor for validating each order according to the authorized or designated method of payment.

3. The ordering system according to claim 1, wherein each order designates a plurality of food and/or other articles; and wherein said central control includes an aggregation processor for aggregating the designated articles on an article carrier to be conveyed from the article source via said conveyor system to the compartment of the seat and row designated in the respective order.

4. The ordering system according to claim 3, wherein said article source includes a plurality of sources for supplying different types of food and/or other articles, and said aggregation processor aggregates from all said sources all the articles designated in an order on a common article carrier.

5. The ordering system according to claim 1, wherein said input devices are mobile devices in wireless communication with said central control.

6. An ordering system for ordering various types of articles comprising:
    an input device for each person enabling the person to order designated articles to be delivered to a designated seat and row in a seat section;
    an article source for supplying articles designated in each order;
    a conveyor system extending from said article source to said seats of said seat section;
    and a central control in communication with said input devices for receiving orders therefrom and for controlling said conveyor system to convey the articles designated in each order to a compartment at a location adjacent to the occupant of the seat and row designated in each respective order;
    wherein the seats in said seat section are arranged in rows spaced from each other along a first axis, and the seats in each row are spaced from each other along a second axis; and said conveyor system includes: a pair of fixed conveyor sections straddling the seat section and extending along said first axis; a movable conveyor section extending along said second axis and movable on said pair of fixed conveyor sections along said first selected row.

7. The ordering system according to claim 6, wherein said first and second axes are orthogonal X and Y axes, and said article carrier is also movable along said Z-axis into the compartment of said designated seat.

8. The ordering system according to claim 7, wherein said plurality of rows in said seat section are at one level, and said article carrier is movable along said Z-axis the same distance for each row.

9. The ordering system according to claim 7, wherein said plurality of rows in said seat section are at different levels, and said articles carrier is movable along said Z-axis a distance corresponding to the level of designated row.

10. An ordering system for ordering various types of articles comprising:
   an input device for each person enabling the person to order designated articles to be delivered to a designated seat and row in a seat section;
   an article source for supplying articles designated in each order;
   a conveyor system extending from said article source to said seats of said seat section;
   and a central control in communication with said input devices for receiving orders therefrom and for controlling said conveyor system to convey the articles designated in each order to a compartment at a location adjacent to the occupant of the seat and row designated in each respective order;
   wherein said conveyor system includes:
   an input conveyor section extending along a first axis at one side of said seat section;
   a plurality of distribution conveyor sections extending along a second axis, each between a pair of rows and each communicating at one end with said input conveyor section, and at the opposite end with the seats in at least one row;
   a first article carrier carried by said input conveyor section;
   a second article carrier carried by each of said distribution conveyor sections;
   a drive for each of said carrier sections and article carriers controlled by said central control;
   a first article shifter carried by said first article carrier actuatable by said central control to shift the articles carried thereby onto the second article carrier of the selected distribution conveyor section;
   and a second article shifter carried by said second article carrier actuatable by said central control to shift the articles carried thereby into the compartment of designated seats.

11. The ordering system according to claim 10, wherein said rows are at different levels, and said input conveyor section is stepped according to the different levels for conveying the first article carrier to the level of the designated row.

12. The ordering system according to claim 10, wherein said central control actuates said drive of only the distribution conveyor section selected to receive articles shifted from the first article carrier.

13. The ordering system according to claim 10, wherein, during the operation of the system, the central control continuously actuates the drives of said input conveyor section and all said distribution conveyor sections.

14. The ordering system according to claim 1, wherein the person ordering the selected articles also specifies the time of delivery, and said central control controls said conveyor system to deliver the selected articles at the specified time to the designated row and seat.

15. The ordering system according to claim 1, wherein said conveyor system includes rails.

16. The ordering system according to claim 1, wherein said conveyor system includes belts.

* * * * *